(12) United States Patent
Kalich et al.

(10) Patent No.: US 8,626,352 B2
(45) Date of Patent: Jan. 7, 2014

(54) HYDROELECTRIC POWER OPTIMIZATION SERVICE

(75) Inventors: Clint Kalich, Spokane, WA (US); Xin Shane, Spokane, WA (US)

(73) Assignee: Avista Corporation, Spokane, WA (US)

( * ) Notice: Subject to any disclaimer, the term of this patent is extended or adjusted under 35 U.S.C. 154(b) by 336 days.

(21) Appl. No.: 13/014,602

(22) Filed: Jan. 26, 2011

(65) Prior Publication Data

US 2012/0191426 A1 Jul. 26, 2012

(51) Int. Cl.
*G06F 19/00* (2011.01)

(52) U.S. Cl.
USPC ................................................ 700/291; 703/2

(58) Field of Classification Search
USPC ............................................. 700/291; 703/2
See application file for complete search history.

(56) References Cited

U.S. PATENT DOCUMENTS

| | | | | |
|---|---|---|---|---|
| 4,255,787 A * | 3/1981 | Hoffmann et al. | | 700/287 |
| 4,674,279 A | 6/1987 | Ali et al. | | |
| 4,794,544 A * | 12/1988 | Albright et al. | | 700/287 |
| 5,347,446 A | 9/1994 | Iino et al. | | |
| 5,742,515 A | 4/1998 | Runkle et al. | | |
| 5,757,665 A | 5/1998 | Nestler et al. | | |
| 5,812,421 A | 9/1998 | Fujii et al. | | |
| 5,913,179 A | 6/1999 | Sutton et al. | | |
| 5,953,227 A | 9/1999 | March et al. | | |
| 6,889,141 B2 | 5/2005 | Li et al. | | |
| 7,349,831 B2 | 3/2008 | Belcher et al. | | |
| 7,873,442 B2 * | 1/2011 | Tsui | | 700/291 |
| 2003/0041016 A1 | 2/2003 | Spool et al. | | |
| 2003/0041017 A1 | 2/2003 | Spool et al. | | |
| 2003/0041038 A1 | 2/2003 | Spool et al. | | |
| 2003/0041039 A1 | 2/2003 | Spool et al. | | |
| 2003/0093332 A1 | 5/2003 | Spool et al. | | |
| 2004/0253097 A1 * | 12/2004 | Kao | | 415/204 |
| 2005/0102173 A1 | 5/2005 | Barker et al. | | |
| 2005/0160128 A1 | 7/2005 | Fardanesh | | |
| 2006/0072014 A1 * | 4/2006 | Geng et al. | | 348/159 |
| 2006/0206240 A1 * | 9/2006 | Tsui | | 700/291 |
| 2007/0112443 A1 * | 5/2007 | Latham et al. | | 700/29 |
| 2007/0150157 A1 * | 6/2007 | Lee et al. | | 701/93 |
| 2008/0195362 A1 | 8/2008 | Belcher et al. | | |
| 2008/0255893 A1 | 10/2008 | Barker et al. | | |
| 2009/0021011 A1 * | 1/2009 | Shifrin et al. | | 290/43 |
| 2009/0134623 A1 * | 5/2009 | Krouse | | 290/43 |
| 2011/0283705 A1 * | 11/2011 | Oliver | | 60/698 |
| 2011/0313777 A1 * | 12/2011 | Baeckstroem et al. | | 704/500 |

OTHER PUBLICATIONS

"Solving Linear Systems: Iterative Methods and Sparse Systems", COS 323, Princeton University lecture notes, 2006.*
Reznicek, et al., "Practical application of successive linear programming for reservoir operations at Manitoba Hydro", Proceedings of the Baltimore Symposium, May 1989, 12 pages.

(Continued)

*Primary Examiner* — Michael D Masinick
(74) *Attorney, Agent, or Firm* — Lee & Hayes, PLLC

(57) ABSTRACT

A non-linear power equation may be solved in linear form by locking a variable or variables and iteratively solving to provide a Web service for accurately and quickly estimating optimized power solutions for hydroelectric power stations. Additionally, these iterative calculations may provide for long term water resource planning and more accurate estimation models. Further, such optimized power solutions may be usable to create accurate and timely water management models for the operation and planning of hydroelectric power stations.

32 Claims, 5 Drawing Sheets

(56) References Cited

OTHER PUBLICATIONS

"Vista Reference Guide Overview", Synexus Global, retrived on Jul. 29, 2011 at <<http://www.synexusglobal.com/pdfs/Reference_Guide_Supplement_A_Overview_Version_5_0.pdf>>, 69 pages.

Aquatic Informatics, retrieved on Mar. 8, 2011 at <<http://www.aquaticinformatics.com/>>, 1 page.

CddHoward Consulting Ltd., retrieved on Mar. 8, 2011 at <<http://www.cddhoward.com/presentations.html>>, 1 page.

RiverMorph Stream Restoration Software, retrieved on Mar. 8, 2011 at <<http://www.rivermorph.com/>>, 1 page.

RiverWareTM, retrieved on Mar. 8, 2011 at <<http://cadswes.colorado.edu/PDF/RiverWare/RiverWare-Brochure.pdf>>, 8 pages.

Synexus Global, retrieved on Mar. 8, 2011, at <<http://www.synexusglobal.com/product.html>>, 1 page.

WRCS Hydrology and Hydrolics Software Suite, retrieved on Mar. 8, 2011 at <<http://www.waterengr.com/>>,.

Non-Final Office Action for U.S. Appl. No. 13/014,555, mailed on Apr. 3, 2013, Clint Kalish et al., "Hydroelectric Power Optimization", 9 pages.

* cited by examiner

| | A | B | C | D | E | F | G | H | J | K | | P |
|---|---|---|---|---|---|---|---|---|---|---|---|---|
| | Pwr Crv | Flow | Benchmrk %Eff. | P/H | Pred. Line 1 | Pred. Line 2 | Pred. Line 3 | Pred. Line 4 | Pred. Line 5 | Error Line 1 | ... | Error Line 5 |
| | %Eff. | | | | | | | | | | | |
| | - | 0 | - | 0 | - | (0.07) | (0.12) | 0.22 | 0.63 | - | ... | 0.63 |
| | 45.03 | 2,000 | 41.52 | 0.07 | 0.07 | 0.07 | 0.05 | 0.31 | 0.63 | - | ... | 0.56 |
| | 47.94 | 2,200 | 44.21 | 0.08 | 0.08 | 0.08 | 0.06 | 0.32 | 0.63 | (0.00) | ... | 0.55 |
| | 50.66 | 2,400 | 46.71 | 0.09 | 0.08 | 0.10 | 0.08 | 0.32 | 0.63 | (0.01) | ... | 0.53 |
| | 53.19 | 2,600 | 49.04 | 0.11 | 0.09 | 0.11 | 0.10 | 0.33 | 0.63 | (0.02) | ... | 0.52 |
| | 55.55 | 2,800 | 51.22 | 0.12 | 0.10 | 0.13 | 0.11 | 0.34 | 0.63 | (0.02) | ... | 0.51 |
| | 57.76 | 3,000 | 53.26 | 0.14 | 0.11 | 0.14 | 0.13 | 0.35 | 0.63 | (0.03) | ... | 0.49 |
| | 59.83 | 3,200 | 55.17 | 0.15 | 0.11 | 0.15 | 0.14 | 0.36 | 0.63 | (0.04) | ... | 0.48 |
| | 61.79 | 3,400 | 56.97 | 0.16 | 0.12 | 0.17 | 0.16 | 0.37 | 0.63 | (0.04) | ... | 0.46 |
| | 63.63 | 3,600 | 58.67 | 0.18 | 0.13 | 0.18 | 0.18 | 0.37 | 0.63 | (0.05) | ... | 0.45 |
| | 65.38 | 3,800 | 60.28 | 0.19 | 0.13 | 0.20 | 0.19 | 0.38 | 0.63 | (0.06) | ... | 0.43 |
| | 67.03 | 4,000 | 61.81 | 0.21 | 0.14 | 0.21 | 0.21 | 0.39 | 0.63 | (0.07) | ... | 0.42 |
| | 68.61 | 4,200 | 63.26 | 0.22 | 0.15 | 0.22 | 0.23 | 0.40 | 0.62 | (0.08) | ... | 0.40 |
| | ... | ... | ... | ... | ... | ... | ... | ... | ... | ... | ... | ... |
| | 87.25 | 8,400 | 80.45 | 0.57 | 0.30 | 0.51 | 0.57 | 0.58 | 0.62 | (0.28) | ... | 0.05 |
| | 87.05 | 8,600 | 80.27 | 0.58 | 0.30 | 0.53 | 0.58 | 0.58 | 0.62 | (0.28) | ... | 0.03 |
| | 86.67 | 8,800 | 79.91 | 0.59 | 0.31 | 0.54 | 0.60 | 0.59 | 0.62 | (0.29) | ... | 0.02 |
| | 86.08 | 9,000 | 79.37 | 0.60 | 0.32 | 0.56 | 0.62 | 0.60 | 0.62 | (0.29) | ... | 0.01 |

HYDRO-SYSTEM DATA 200

HYDROELECTRIC POWER OPTIMIZATION SERVICE

BACKGROUND

Hydroelectric power generation generally involves harnessing the force of moving water to generate electricity. In most cases, an electric generator generates electricity from the potential energy of dammed water that drives a water turbine. Often, a hydroelectric power station may generate electricity for an entire area; however, some hydroelectric stations are controlled by and for a single entity, such as a factory. There are many factors involved in the operation of hydroelectric power stations. For example, constraints such as reservoir volume, the difference in height (i.e., the head) between the reservoir (forebay) and the water's outflow (tailrace), turbine efficiency, water flow rates, and even water rights can each have effects on the amount of power generated at any given time.

Managers and operators of hydroelectric power stations are often confronted with difficult operational and planning decisions. For example, determining appropriate flow rates through each turbine or combinations of turbines, pumped-storage times and volumes, and turbine replacement options are all decisions that may face each hydroelectric power station manager or operator. Additionally, these operators may need to evaluate operational policy, optimize the system, administer water rights and accounting, and prepare long-term resource plans. Unfortunately, current products do not provide accurate or efficient solutions for handling today's highly competitive water resources needs.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
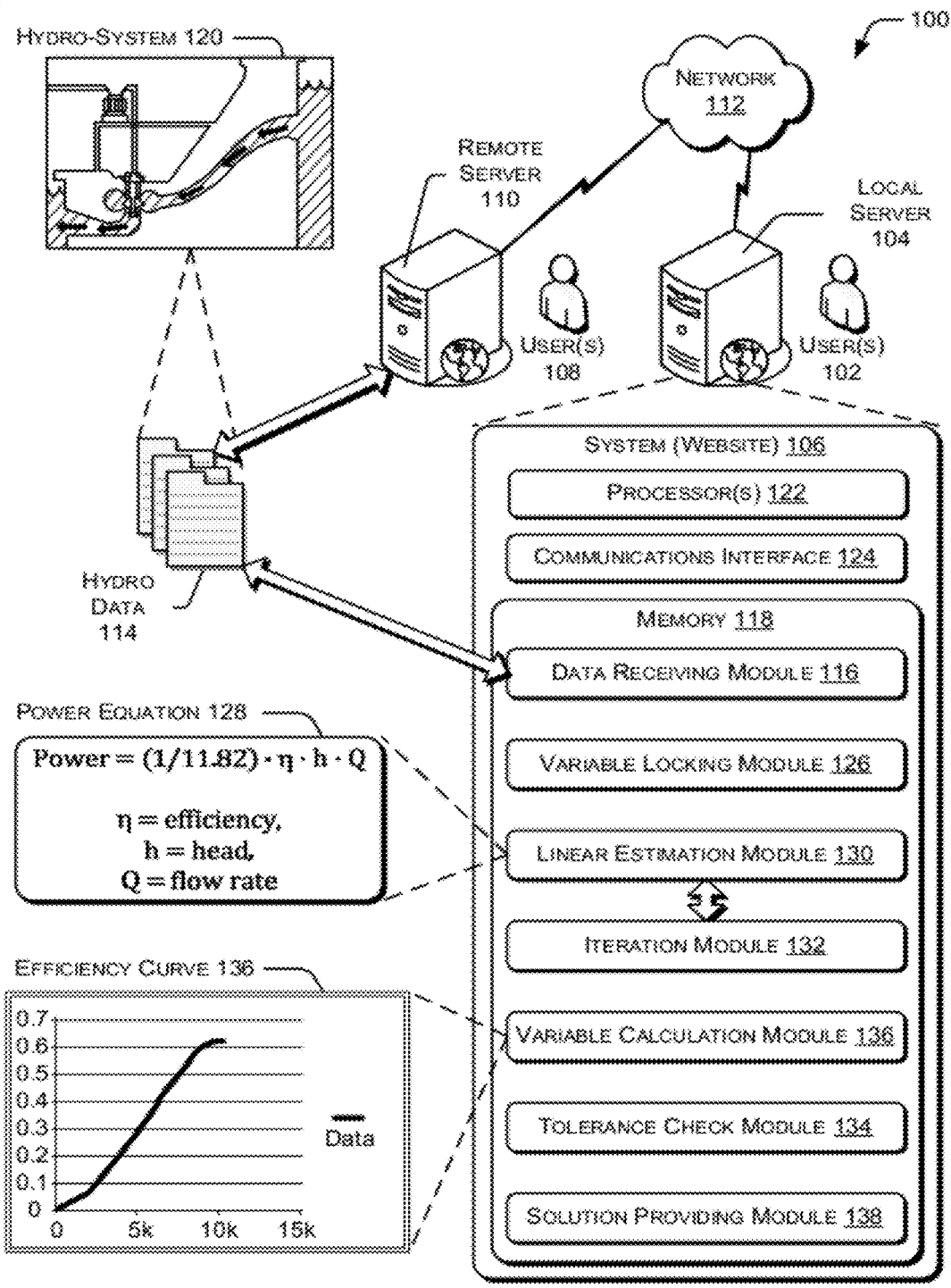
FIG. 1 illustrates an example architecture for providing optimized hydroelectric solutions based at least in part on hydroelectric power system data received from local data or from a remote server.

Embodiments of the present disclosure are directed to, among other things, providing optimized hydroelectric solutions for managing and/or operating hydroelectric power stations or other types of water management systems. As an overview, hydroelectric power may be generated by harnessing the potential energy contained in dammed water that drives a turbine or water wheel, with the aid of an electric generator for converting the mechanical energy of the turbine into electricity. Mechanical gates or sluices may control the flow rate of the dammed water through the turbine. In some instances, pumps may channel the water back to the reservoir to store energy for peak hours. Station operators and managers generally face a myriad of challenges when controlling the flow and storage of water while attempting to optimize power production. This is due to the fact that many factors affect power output, such as turbine efficiency, head, and flow. Additionally, each of these factors may affect the other, such that the equation for calculating power, $$\text{Power} = (1/11.82) \cdot \eta \cdot h \cdot Q \quad \text{(Equation 1)}$$

where $\eta$=efficiency, $h$=head, and $Q$=flow rate, is a non-linear, multi-variable equation. For example, an increase in flow may directly affect efficiency and/or head; however, the relationships may not be linear. Additionally, other factors, such as water rights (e.g., tribal fishing rights, conservation and environmental regulations, etc.), private licenses, public grants, reservoir size, and rainfall can indirectly affect the power output by directly affecting the equation variables. For example, rainfall may affect head while licenses and grants may require changes in flow rate.

In some instances, a system of the present disclosure may receive hydroelectric power station data from a local data store, or from a remote server, for calculating an optimized power solution. Additionally, or in the alternative, the system may form optimization models for optimizing power over an extended period of time. The system may use an iterative process to calculate the optimized power solution linearly. As such, a variable of the power equation (Equation 1) may be locked with an estimated value to create a linear estimation. In some instances, the locked variable may be the head variable, while in other cases, the flow or the efficiency variables may be locked. Locking a variable entails setting a particular variable to a predetermined or estimated value so that it is no longer an unknown. As such, a solution to a single non-linear equation may be computed linearly. In some examples, based on locking a variable and solving linearly, a solution that historically would have taken hours, may now be returned in less than 60 seconds, or sometimes less than 10 seconds, depending on the sample size of data, the accuracy of the desired solution, and the speed of the computing system used to compute the solution. Multi-year studies that historically were impossible to solve may now be completed in hours or a few days.

In one aspect, the head variable may be locked with an estimated head value. The system may then solve the equation for power using the estimated head value and known efficiency and flow data. Additionally, the known efficiency and flow data may be accessible, or extrapolated, from an efficiency curve for a particular turbine. Alternatively, the efficiency and flow data may be calculated based on historical data from a known power station, or it may be received from the remote server that provided the power station data.

When the head value is locked with an estimated head value, the system may then calculate an actual head value based at least in part on other information known about the power station. In one aspect, this other information may be flow and efficiency data from an efficiency curve, data from a historical spreadsheet, or measured data for a particular point in time. The calculated head value may then be compared to the estimated head value used in calculating the optimized power solution. In one aspect, if the difference is outside a predetermined tolerance threshold, and/or an iteration threshold has not been reached, the system may re-solve the equation for power using the calculated head value. Additionally, the system may iteratively repeat these calculations and comparisons until the head value difference (between the previously locked head value and the next calculated head value) is within the predetermined tolerance threshold or until the iteration threshold is reached.

In some aspects, the optimized power solution may be made up of each calculated power solution and/or data from each iteration. For example, the optimized power solution may include one power solution for a given time, a combination of power solutions for different respective times, or a combination including one or more power solutions and the associated variable inputs that formed each respective power solution for one or more respective times. The system may then populate a spreadsheet or database with the data, provide the data to a local user of the system, or provide the data to a remote server.

Additionally, the described techniques may also be used on water management systems that are not designed to generate power such as water storage reservoirs for flood control. Alternatively, or in addition, the described techniques may also be used for providing solutions to systems that both provide power generation and water storage.

The discussion begins with a section entitled "Illustrative Architecture," which describes a non-limiting environment in which optimized power solutions may be iteratively calculated and provided. Next, a section entitled "Illustrative Data" follows and describes example data for implementing the described calculations. Finally, the discussion concludes with a section entitled "Illustrative Processes" and a brief conclusion.

This brief introduction, including section titles and corresponding summaries, is provided for the reader's convenience and is not intended to limit the scope of the claims, nor the proceeding sections. Furthermore, the techniques described above and below may be implemented in a number of ways and in a number of contexts. Several example implementations and contexts are provided with reference to the following figures, as described below in more detail. However, the following implementations and contexts are but a few of many.

Illustrative Architecture

FIG. 1 depicts an illustrative architecture 100 in which techniques for iteratively calculating and providing optimized hydroelectric power solutions may be implemented. In architecture 100, one or more users 102 may utilize local server 104 to access a system (or website) 106 for iteratively calculating and providing optimized hydroelectric power solutions. Additionally, or alternatively, one or more users 108 may utilize a remote server 110 to access the system 106 via a network 112. Network 112 may include any one or a combination of multiple different types of wired or wireless networks, such as cable networks, the Internet, local area networks (LANs), and other private and/or public networks. While the illustrated example represents users 108 accessing system 106 over network 112, the described techniques may equally apply in instances where users 108, or users 102, interact with the system 106 over the phone, via a kiosk, or in any other manner. It is also noted that the described techniques may apply in other client/server arrangements (e.g., via a dedicated terminal, etc.), as well as in non-client/server arrangements (e.g., locally-stored software applications, etc.) such as when users 102 access the system 106 via the local server 104.

As described briefly above, system 106 may allow users 102 or 108 to provide hydroelectric power station data 114 ("hydro data") to system 106. In some aspects, the users 102 may provide the hydro data 114 directly to the system via a data receiving module 116 to be stored in memory 118 of the local server 104. In other aspects, however, users 108 may provide the hydro data 114 to the remote server 110. Here, the remote server 110 may provide the hydro data 114 to system 106 via the network 112. As noted above, system 106 may be implemented as a website 106 for interacting with users 108 over the network 112. System 106 may additionally, or alternatively, be implemented as a Web service, or other application programming interface (API) that allows communication between the system 106 and users of computing devices other than local server 104. In yet other examples, users 108 may provide hydro data 114 in any digital manner known, such that system 106 may receive it at the local server 104. For example, users 108 may provide the hydro data 114 to system 106 via email, text message, compressed file, Hypertext Markup Language ("HTML") file, Extensible Markup Language ("XML") file, data stream or feed, etc. Additionally, in one example, the hydro data may be collected by a sensor network and received by system 106 in real-time or substantially real-time.

In some examples, users 108 may provide data to system 106 and receive power solutions in exchange for fees. The fees may be one-time fees, fees based on a subscription basis, fees based at least in part on the granularity of the optimal power data, an amount of exchange of the optimal power data, fees based on a frequency of exchange of the optimal power data, fees based on a speed with which the optimal power data is provided, fees based on a number of clock cycles to determine the optimal power data, fees based on a number of computations to determine the optimal power data, and/or fees based on a power savings achievable using the optimal power data. Additionally, in some examples, optimal power data may be provided to remote server 110 in the form of potential profit estimates for a hydroelectric power station, results of a potential turbine comparison, results of a power savings analysis, and/or in the form of peak shaving data. Hydro data may also include a recommendation to make a change, perform an act (e.g., maintenance or replacement of turbines, open or close sluice gates), etc.

Further, as noted briefly above, hydro data 114 may comprise hydroelectric power station data from a hydroelectric power station (or system) such as hydro-system 120. In one aspect, hydro-system 120 represents a hydroelectric power station with one or more dams, reservoirs, turbines, generators, and/or transformers. The hydro data 114 may be data corresponding to an entire hydro-system made up one or more of each of the elements listed above, may be data corresponding to a hydro-system such as the one shown in FIG. 1 (i.e., hydro-system 120) made up of a single reservoir, dam, turbine, generator, and transformer, or may be data corresponding to a hydro-system of any configuration.

As noted above, local server 104, or multiple local servers perhaps arranged in a cluster or as a server farm, may host system (or website) 106. Other server architectures may also be used to host the system 106. System 106 is capable of handling requests from many users and serving, in response, various user interfaces that can be rendered locally by a display device of the local server 104 or at user computing devices, such as remote server 110. System 106 can be any type of software system or website that supports user interaction, including interaction with operators, managers, contractors, or other types of users, and so forth. However, as discussed above, the described techniques can similarly be implemented without a website altogether.

Taken together, FIG. 1 allows users 102 and/or users 108 to request that optimized power solutions be calculated based on provided hydro data 114. To illustrate, envision that user 108 accesses system 106 via network 112 and provides hydro data 114 corresponding to at least flow data, head data, and efficiency data for hydro-system 120 over the previous six months. In this example, the hydro data 114 may be provided in a spreadsheet file, database file, or other type of file for organizing data, with each respective value corresponding to a particular time of day for the six month period. In other examples, however, the system 106 may provide a graphical user interface (GUI) to user 108 (including text fields for entering data), displayed by the remote server 110, which provides a method for manually entering the hydro data 114 or a method for uploading a file containing the hydro data 114.

While FIG. 1 illustrates local server 104 and remote server 110 as personal computing devices, other types of computing devices may include laptop computers, portable digital assistants ("PDAs"), mobile phones, set-top boxes, game consoles, mainframe computers, super computers, data centers, and so forth. In each instance and as illustrated, each server is equipped with one or more processors 122 and memory 118 to store applications and data, such as the data receiving module 116 that enables hydro data 114 to be provided to system 106.

Once the data is received by system 106 via the Internet or other network connection, such as network 112, the system 106 may iteratively calculate optimized power solutions based on the hydro data 114 and provide the optimized power solutions to the users 108 via the network 112. In some instances the power solutions may be provided based on iteratively calculating, at a predetermined time interval granularity (e.g., one week, one day, or even one minute), until a tolerance percentage is reached, until an iteration threshold is reached, and/or until a predetermined time period has elapsed. In one some examples, the tolerance percentage may be 1%, 0.05%, or any other percentage based on the intended use of the solution.

FIG. 1 further illustrates local server 104 having processing capabilities and memory suitable to store and execute computer-executable instructions. In this example, local server 104 includes one or more processor(s) 122, communications interface(s) 124, and memory 118. Depending on the configuration of local server 104, memory 118 is an example of computer storage media and may include volatile and nonvolatile memory. Thus, memory 118 may include, but is not limited to, random-access memory ("RAM"), read-only memory ("ROM"), electrically erasable programmable read-only memory ("EEPROM"), flash memory, or other memory technology, or any other non-transmission medium which can be used to store digital items or applications and data which can be accessed by local server 104. Computer storage media, however, does not include any data in a modulated data signal, such as a carrier wave or other propagated transmission medium.

Memory 118 may be used to store any number of functional components that are executable on processor(s) 112, as well as data and content items that are rendered by local server 104. Thus, memory 118 may store an operating system and several modules containing logic.

As noted above, a data receiving module 116 located in memory 118 and executable on processor(s) 122 may facilitate receiving hydroelectric power station data, such as hydro data 114.

Memory 118 may further store variable locking module 126 to lock a variable of the non-linear, multi-variable power equation 128 (Equation 1). In one aspect, variable locking module 126 may be configured to lock the head variable by setting the "h" variable of the power equation 128 to an estimated head value. In some examples, the estimated head value may be selected from the hydro data 114, from historical data of another power station, randomly, or in a pseudo-random fashion. In another aspect, however, variable locking module 126 may be configured to lock the efficiency variable or the flow variable by setting the "η" or "Q" variables to estimated values, respectively.

Memory 118 may also store linear estimation module 130 and iteration module 132. Linear estimation module 130 may be configured to calculate a linear estimation of the non-linear power equation 128. In other words, by locking a single variable, the non-linear power equation 128 becomes a linear equation and may be solved much faster and much less computationally demanding. While the solution is an estimate, the iteration module 132 described will generally converge on a solution that is more accurate than the original estimated solution. In one example, once the variable locking module 126 locks the head variable, and flow and efficiency data for a given time period are received from the hydro data 114 spreadsheet, the linear estimation module 130 may calculate an estimated power solution linearly.

Memory 118 may also store variable calculation module 134, which may be configured to calculate an actual value for the variable that was previously locked by the variable locking module 126. That is, in the example, where the head value is locked prior to the linear estimation, the variable calculating module 134 will calculate an actual head value. In some aspects, variable calculation module 134 may calculate the actual value based on an efficiency curve 136 for a particular turbine. In other examples, the actual value may be calculated based on other data from the hydro data 114 spreadsheet or other data known about the hydro-system 120. Additionally, in some examples, the efficiency curve 136 may chart turbine efficiency against flow. This data may be provided by the manufacturer of the turbine, may be known from trials, or may be determined from historical data.

Iteration module 132 may be configured to iterate to within a tolerance and/or until an iteration threshold is reached. Iteration module 132 may also be configured to operate the linear estimation module 130 and the variable calculation module 134 repeatedly until such tolerance or threshold is reached. For example, until the tolerance or threshold are reached, the iteration module 132 may continue to instantiate the linear estimation followed by the variable calculation.

Additionally, memory 118 may further store a tolerance checking module 136 configured to check whether the linear estimation module 130 has estimated the power solution to within the tolerance or whether the iteration threshold has been reached. In one example, an iteration threshold of 5 iterations may be pre-selected by users 102 or 108. In this case, the tolerance checking module 136 will determine after the fifth iteration, that the condition has been met. The tolerance checking module 136 will then instruct the iteration module 132 to stop iterating. In another example, a tolerance of 1% may be pre-selected by users 102, 108, or by another user of system 106. In this example, the tolerance checking module 136 will determine if the difference between the calculated actual value for the locked variable is within 1% of the value used for that variable in the last estimation iteration. If so, the tolerance check module 136 will instruct the iteration module 132 to stop iterating. In the alternative, the iteration module 132 will continue iterating until either the tolerance or the iteration threshold is reached.

In some instances, memory 118 may also store a solution providing module 138 configured to provide the optimized power solutions to users 102, users 108, or some other users who have requested the data. In some examples, providing optimized power solutions involves, storing the solutions in memory 118 or some other memory, displaying them to users 102 of the local server 104, transmitting them over network 112 to remote server 110, or preparing them for display to users 108. Additionally, in some aspects, the optimized power solutions may be formatted such that they accurately may be represented or displayed within a spreadsheet application.

In one general, non-limiting example, the following calculations may be performed by several of the afore-mentioned modules:

- An estimated head value of 20 meters is selected from a table of historical data and a tolerance of 1% is selected.
- Based on an appropriate efficiency curve, efficiency and flow values of 50% and 2 cubic feet per minute ("CFM") (for example) are calculated and entered into to the power equation (Equation 1) along with the estimated head.
- An estimated power of 20 kW may be solved for based on the above values.
- Based on calculated forebay and tailrace changes that occurred in response to the flow of 2 CFM, an actual head may be calculated.
- In this example, the actual head is calculated to be 19.5 meters; thus, the percent difference is (20−19.5)/20=0.025 or 2.5%.
- When 2.5% is compared against the selected 1% tolerance, the system determines that the estimated value is not within the tolerance and another iteration may be performed.
- During the next iteration, the calculated head value of 19.5 meters will be used as the head value.
- This process may continue until the head value converges to within the selected tolerance or until an iteration threshold is reached.

Various instructions, methods and techniques described herein may be considered in the general context of computer-executable instructions, such as program modules, executed by one or more computers or other devices. Generally, program modules include routines, programs, objects, components, data structures, etc. for performing particular tasks or implementing particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on some form of computer-readable storage media.

Illustrative Data

Figure 2:
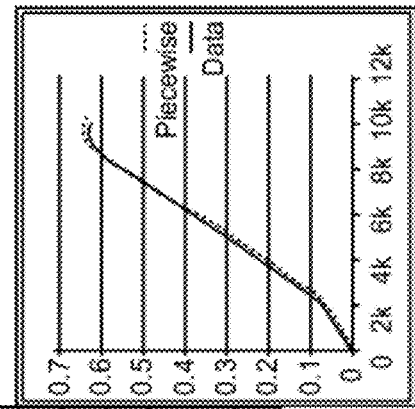
FIG. 2 illustrates an example of hydroelectric system data, which, in one aspect, may be displayed by a spreadsheet application.

FIG. 2 depicts an illustrative spreadsheet document of hydro-system data 200 for use by the system 106 of FIG. 1. In one aspect, the hydro-system data 200 includes data collected over a period of time at a hydroelectric power station. In another aspect, the hydro-system data 200 includes iteratively created estimations of power solutions for a given turbine or a system of turbines. In yet another aspect, the hydro-system data 200 may be a combination of historical data and iterative calculations.

In one example, column A of the hydro-system data 200 may represent theoretical turbine efficiency for a given turbine for each flow. Additionally, column B of the hydro-system data 200 may represent each potential flow rate for the power station from 0 to 9,000 cubic feet per minute (CFM). In one example, column C may represent a benchmarked efficiency which is calculated by dividing the power curve efficiency (column A) by some historical data regarding the actual turbine or the actual efficiency at each given flow.

In one aspect, column D of the hydro-system data 200 may represent the calculated power solution based on an estimated head value. Columns E, F, G, H, and J may then represent the calculated head value for each of five iterations while columns K, L, M, N, and P represent the percent error between each calculated head value and the estimate. Where the percent error was within the pre-selected tolerance (in this case 1%, or 0.01), the calculated head values are shaded grey in columns E-J. At these instances, the power calculation has been optimized.

As seen here, hydro-system data 200 may be represented in spreadsheet form. However, the data may be stored, displayed, rendered, provided, or represented in any other form known. Additionally, this spreadsheet may serve as the underlying data to perform the iterations discussed above and/or it may be used as a GUI for the user to interact with the system 106 and to present the resulting power solutions to users 102 or 108.

Illustrative Processes

Figure 3:
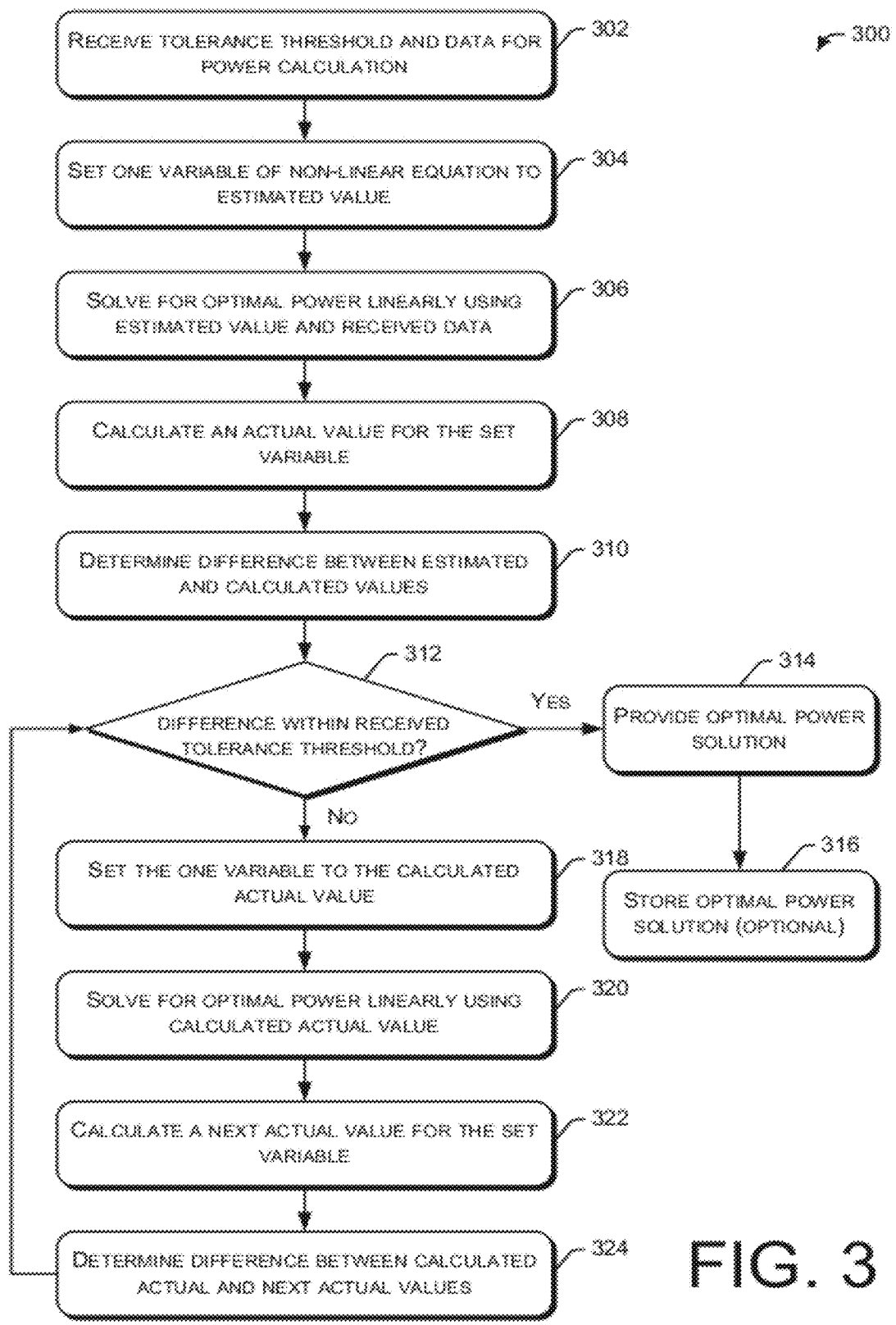
FIG. 3 is a flow diagram illustrating a method of providing the optimized hydroelectric solutions of FIG. 1.
Figure 4:
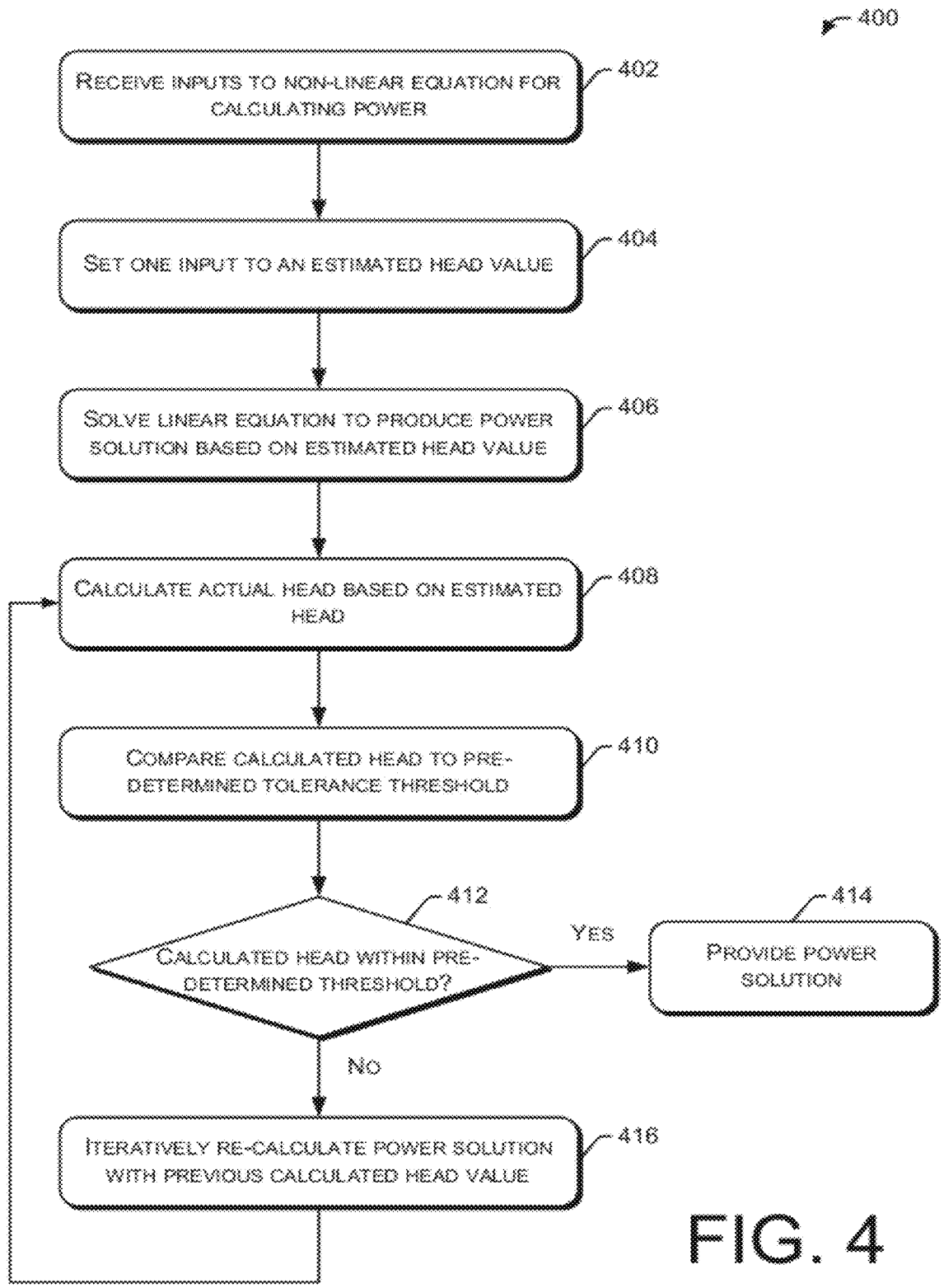
FIG. 4 is a flow diagram illustrating an alternative method of providing the optimized hydroelectric solutions of FIG. 1.
Figure 5:
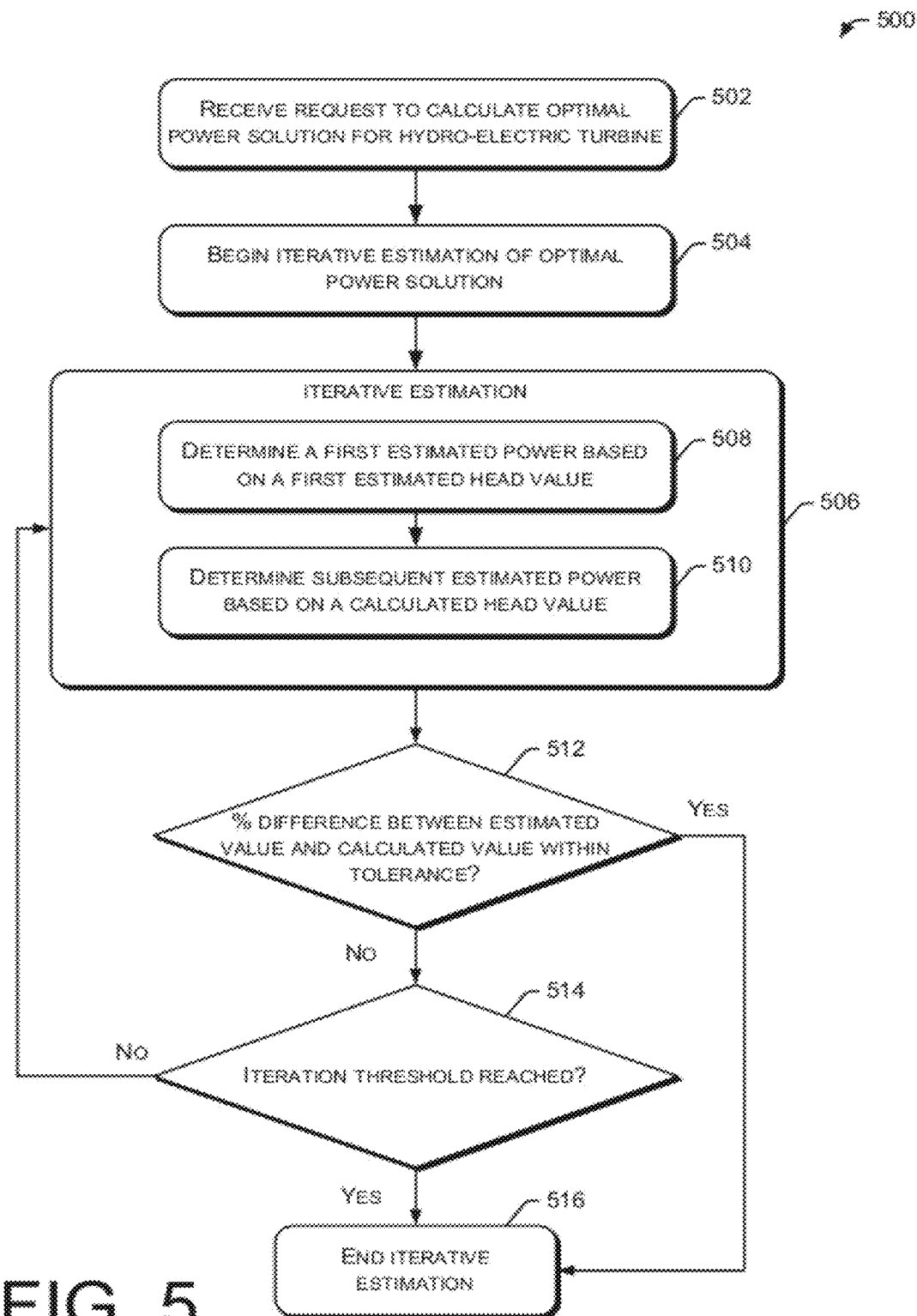
FIG. 5 is a flow diagram illustrating an additional alternative method of providing the optimized hydroelectric solutions of FIG. 1.

FIGS. 3-5 are flow diagrams showing respective processes 300, 400, and 500 for iteratively calculating and providing optimized power solutions for hydroelectric power stations. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

FIG. 3 illustrates an example flow diagram of process 300 for iteratively estimating optimized power solutions, and may, but need not, be implemented using the systems, architecture, and data of FIGS. 1 and 2.

Process 300 includes receiving a tolerance threshold and data as inputs for making a power calculation at 302. In one aspect, a user of a local computing device may provide the data. In other aspects, the data may be provided by a user of a remote computing device accessing process 300 over a network such as the Internet. Further, the tolerance threshold may be selected by a user through a GUI, pre-selected based on operational criteria, or set to a standard value. At 304, process 300 may set one of the variables of the power calculation to an estimated value. In one aspect, process 300 may set the head variable to an estimated head value; however, other variables may be locked. At 306, process 300 may solve for an optimal power solution linearly using the estimated value and the data received at 302. For example, when the head variable is locked with an estimated head value, values for flow and efficiency may be selected from the received data for calculating the estimated power.

Process 300 may also include calculating an actual value for the locked variable at 308. In the above example, when the head variable is locked (i.e., set to an estimated value), the process 300 may calculate an actual head value here. At 310, process 300 may determine a difference between the estimated value and the calculated value. That is, by way of example only, process 300 may determine the percentage difference between estimated head value and the calculated head value. In other aspects, however, estimated and calculated head values may be used, along with the flow and efficiency data used to solve the optimal power solution, to determine estimated and actual power. The estimated and actual power may then be used, along with market rate information, to determine an estimated dollar value and an actual dollar value for electricity at each time period. In some aspects, at 310, process 300 may determine a percentage difference between the estimated dollar value and the actual dollar value.

At 312, process 300 may determine whether the percent difference is greater than the tolerance threshold received at 302. If the percent difference is within the received tolerance threshold, process 300 may provide the optimal power solution at 314. Optionally, at 316, process 300 may store the optimal power solution as well. Alternatively, if the percent difference is less than the received tolerance threshold, process 300 may set the previously locked variable to the most recently calculated actual value for that variable at 318. Following the same example as above, at 318, process 300 may lock the head variable by setting it to the most recently calculated actual value. At 320, process 300 may, once again, solve for optimal power linearly, this time using the most recently calculated actual value.

At 322, process 300 may calculate a next actual value for the newly locked variable. Process 300 may then determine the difference between the calculated actual value from 320 and the next actual value calculated at 322 to determine a percent difference. Again, process 300 will determine whether the difference (this time between the calculated actual value from 320 and the next actual value from 322) is greater than the received tolerance threshold. As seen here, process 300 iterates from 318 to 324 and back to 312 until the desired tolerance is reached. In this way, both speed and accuracy can be controlled by selecting appropriate tolerance and iteration thresholds.

FIG. 4 illustrates an example flow diagram of process 400 for an alternative implementation for iteratively calculating an optimized power solution for a hydroelectric power station and may, but need not, be implemented using the systems, architecture, and data of FIGS. 1 and 2.

Process 400 includes receiving inputs to a non-linear equation for calculating power at 402. At 404, process 400 may set the head variable to an estimated head value. Process 400 may solve a linear equation to produce a power solution based on the estimated head value at 406. At 408, process 400 may calculate an actual head based, at least indirectly, on the estimated head. In one example, the actual head is calculated by determining a flow rate and turbine efficiency for the original estimated head. In another example, however, the actual head is calculated by using historical data from a hydro-system. At 410, process 400 may compare the calculated head to a predetermined tolerance threshold. In one aspect, this comparison involves determining a percent difference between the estimated head and the actual head and comparing the difference against the tolerance threshold.

At 412, process 400 may determine whether the calculated head is within the predetermined threshold. Generally, being within a threshold implies that the percent difference between the actual and estimated head values is less than the tolerance threshold when the tolerance threshold is represented as a percentage. If, at 412, process 400 determines that the calculated head, or percent difference, is within the tolerance threshold, process 400 may provide the power solution at 414. On the other hand, if the calculated head, or percent difference, is still greater than the tolerance threshold, process 400 may iteratively re-calculate the power solution using the previously calculated head value at 416 and return to 408 for calculating a next actual head value based at least in part on the most recently calculated head. Here, as in process 300, the iterative process may continue until the tolerance threshold is satisfied.

FIG. 5 illustrates an example flow diagram of process 500 for an alternative implementation for iteratively calculating an optimized power solution for a hydroelectric power station and may, but need not, be implemented using the systems, architecture, and data of FIGS. 1 and 2.

Process 500 includes receiving a request to calculate an optimal power solution for a hydroelectric turbine at 502. At 504, process 500 may begin an iterative estimation process for calculating an optimal power solution. Iterative estimation, at 506, may include determining a first estimated power based at least in part on a first estimated head value at 508 and determining subsequent estimated power solutions based at least in part on a calculated head value at 510.

At 512, process 500 may decide whether the percent difference between the estimated value and the calculated value is within a tolerance. If not, at 514, process 500 may determine whether an iteration threshold has been reached. If the percent difference is not within the tolerance at 512 and the iteration threshold is not reached at 514, process 400 may return to 506 to implement another iterative estimation. On the other hand, if either the percent difference is within the tolerance at 512 or the iteration threshold is reached at 514, process 500 may end the iterative estimation at 516.

CONCLUSION

Although embodiments have been described in language specific to structural features and/or methodological acts, it is to be understood that the disclosure is not necessarily limited to the specific features or acts described. Rather, the specific features and acts are disclosed as illustrative forms of implementing the embodiments.

What is claimed is:

1. One or more computer-readable storage media storing computer-executable instructions that, when executed by a processor, perform acts for providing, from a local computing device, optimized power data of a hydroelectric turbine to a remote computing device, the acts comprising:
receiving, from the remote computing device, a request for the optimized power data;
receiving, from the remote computing device, a tolerance threshold and data for variable inputs to a non-linear equation for calculating, by the local computing device, an optimal power of the hydroelectric turbine, the variable inputs comprising a flow input, an efficiency input, and a head input;
setting, by the local computing device, one of the variable inputs to an estimated value;
solving, by the local computing device, a linear equation for calculating the optimal power of the hydroelectric turbine to produce a power solution, the linear equation comprising the one variable input set to an estimated value and data received from an efficiency curve for the hydroelectric turbine for the variable inputs that are not set to an estimated value;
calculating, by the local computing device, an actual value for the one variable input set to an estimated value based at least in part on the solved linear equation;
determining, by the local computing device, a difference between the estimated value and the calculated actual value;
when the difference is greater than the received tolerance threshold, iteratively performing, by the local computing device, the following acts:
setting the one variable input set to an estimated value to the calculated actual value;

solving for the power solution based at least in part on the calculated actual value;

calculating a next actual value for the one variable input set to the calculated actual value; and determining a next difference between the calculated actual value and the calculated next actual value; and providing, by the local computing device, the optimal power data of the hydroelectric turbine to the remote computing device.

2. The one or more computer-readable storage media of claim 1, further comprising, one or more of the following: replacing a turbine based at least in part on the optimal power, changing a flow rate based at least in part on the optimal power, changing a spill rate based at least in part on the optimal power, changing a price at which power is offered based at least in part on the optimal power, or changing a price at which ancillary services are offered based at least in part on the optimal power.

3. The one or more computer-readable storage media of claim 1, further comprising storing, by the local computing device, the optimal power of the hydroelectric turbine in memory.

4. The one or more computer-readable storage media of claim 1, wherein providing the optimal power to the remote computing device comprises, one or more of the following: providing the optimal power to a spreadsheet application of the remote computing device, providing the optimal power to a user of the remote computing device, preparing the optimal power to be displayed by the remote computing device, serving the optimal power to a Web browser, transmitting the optimal power in an email, or publishing the optimal power to a website.

5. The one or more computer-readable storage media of claim 1, wherein the received data for the variable inputs comprises flow data for the flow input and efficiency data for the efficiency input, and wherein setting one of the variable inputs to an estimated value comprises setting the head input to an estimated head value.

6. The one or more computer-readable storage media of claim 5, wherein calculating an actual value comprises calculating an actual head value based at least in part on a forebay and a tailrace change for the flow data used in solving the linear equation.

7. The one or more computer-readable storage media of claim 5, wherein the flow data and the efficiency data are received from a spreadsheet application of the remote computing device.

8. The one or more computer-readable storage media of claim 1, wherein determining a tolerance comprises receiving a tolerance level from the local computing device.

9. The one or more computer-readable storage media of claim 8, wherein the received tolerance is a tolerance percentage.

10. The one or more computer-readable storage media of claim 9, wherein determining a difference comprises subtracting a first value of the non-linear equation from a second value of the non-linear equation to calculate a difference result and determining a percent different between the difference result and the first value.

11. The one or more computer-readable storage media of claim 1, wherein providing the optimal power to the remote computing device comprises exchanging the optimal power data for a fee associated with the exchange.

12. The one or more computer-readable storage media of claim 11, wherein the fee is based at least in part on one or more of the following: a granularity of the optimal power data, an amount of the optimal power data exchanged, a frequency of exchange of the optimal power data, a speed with which the optimal power data is provided, a number of clock cycles to determine the optimal power data, a number of computations to determine the optimal power data, or a power savings using the optimal power data relative to actual power data.

13. The one or more computer-readable storage media of claim 1, wherein the request for the optimized power data is received from the remote computing device via a Web interface of the local computing device.

14. The one or more computer-readable storage media of claim 1, wherein the request for the optimized power data is received, from the remote computing device, based at least in part on a billing arrangement.

15. The one or more computer-readable storage media of claim 1, further comprising presenting a graphical user interface (GUI) to a user of the remote computing device, the GUI comprising, one or more of the following: a flow data field, an efficiency data field, a head data field, or and/or a constraint data field.

16. The one or more computer-readable storage media of claim 1, wherein providing the optimal power data to the remote computing device comprises one or more of the following: providing potential profit estimates for a hydroelectric power plant, providing results of a potential turbine comparison, providing a power savings, or providing peak shaving data.

17. One or more computer-readable storage media storing computer-executable instructions that, when executed by a processor, perform acts comprising:

receiving a tolerance threshold and data to be used as variable inputs to a non-linear equation for calculating an optimal power of the hydroelectric turbine, the variable inputs comprising a flow input, an efficiency input, and a head input;

setting one of the variable inputs to an estimated value;

solving a linear equation for calculating the optimal power of the hydroelectric turbine to produce a power solution, the linear equation comprising (1) the one variable input set to an estimated value, and (2) data received from an efficiency curve for the hydroelectric turbine, the data received being for the variable inputs that are not set to an estimated value;

calculating an actual value for the one variable input set to an estimated value based at least in part on the solved linear equation;

determining a difference between the estimated value and the calculated actual value for the one variable;

when the difference is greater than the received tolerance threshold, iteratively performing the following acts:

setting the one variable input that was set to an estimated value to the calculated actual value;

solving for the power solution based at least in part on the calculated actual value;

calculating a next actual value for the one variable input set to the calculated actual value; and determining a next difference between the calculated actual value and the calculated next actual value; and when the difference is less than the received tolerance threshold, providing the optimal power of the hydroelectric turbine.

18. The one or more computer-readable storage media of claim 17, further comprising one or more of the following: replacing a turbine based at least in part on the optimal power, changing a flow rate based at least in part on the optimal power, changing a spill rate based at least in part on the optimal power, changing a price at which power is offered based at least in part on the optimal power, or changing a price at which ancillary services are offered based at least in part on the optimal power.

19. The one or more computer-readable storage media of claim 17, further comprising storing the optimal power of the hydroelectric turbine in memory.

20. The one or more computer-readable storage media of claim 17, wherein providing the optimal power comprises one or more of the following: providing the optimal power to a spreadsheet application, providing the optimal power to a user, or preparing the optimal power to be displayed.

21. The one or more computer-readable storage media of claim 17, wherein the received data for the variable inputs comprises flow data for the flow input and efficiency data for the efficiency input, and wherein setting one of the variable inputs to an estimated value comprises setting the head input to an estimated head value.

22. The one or more computer-readable storage media of claim 21, wherein calculating an actual value comprises calculating an actual head value based at least in part on a forebay and a tailrace change for the flow data used in solving the linear equation.

23. The one or more computer-readable storage media of claim 21, wherein the flow data and the efficiency data are received from a spreadsheet application.

24. The one or more computer-readable storage media of claim 17, wherein determining a tolerance comprises receiving a tolerance level from a user or administrator.

25. The one or more computer-readable storage media of claim 24, wherein the received tolerance is a tolerance percentage.

26. The one or more computer-readable storage media of claim 25, wherein determining a difference comprises subtracting a first value from a second value to calculate a difference result and determining a percent difference between the difference result and the first value.

27. A system comprising:
one or more processors;
memory communicatively coupled to the one or more processors;
a data receiving module, stored in the memory and executable on the one or more processors, to receive, from a remote computing device, a tolerance threshold and variable inputs to a non-linear equation for calculating an optimal power of the hydroelectric turbine, the variable inputs comprising a flow input, an efficiency input, and a head input
a variable locking module, stored in the memory and executable on the one or more processors, to set one of the variable inputs to an estimated value;
a linear estimation module, stored in the memory and executable on the one or more processors, to solve a linear equation for calculating the optimal power of the hydroelectric turbine to produce a power solution, the linear equation comprising the one variable input set to an estimated value and data received from an efficiency curve for the hydroelectric turbine for the variable inputs that are not set to an estimated value;
a variable calculation module, stored in the memory and executable on the one or more processors, to calculate an actual value for the one variable input set to an estimated value based at least in part on the solved linear equation;
a tolerance checking module, stored in the memory and executable on the one or more processors, to determine a difference between the estimated value and the calculated actual value;
an iteration module, stored in the memory and executable on the one or more processors, to iteratively calculate the power solution until the percent difference is within the tolerance threshold, the iteration module to
set the one variable input, set to an estimated value, to the calculated actual value;
solve for the power solution based at least in part on the calculated actual value;
calculate a next actual value for the one variable input set to the calculated actual value; and
determine a next difference between the calculated actual value and the calculated next actual value; and
a solution providing module, stored in the memory and executable on the one or more processors, to provide the optimal power data of the hydroelectric turbine to the remote computing device.

28. The system of claim 27, the variable locking module to replace a turbine based at least in part on the optimal power, change a flow rate based at least in part on the optimal power, change a spill rate based at least in part on the optimal power, change a price at which power is offered based at least in part on the optimal power, change a price at which ancillary services are offered based at least in part on the optimal power, or a combination thereof.

29. The system of claim 27, wherein the solution providing module to provide the optimal power to a spreadsheet application of the remote computing device, provide the optimal power to a user of the remote computing device, prepare the optimal power to be displayed by the remote computing device, serve the optimal power to a Web browser, transmit the optimal power in an email, publishing the optimal power to a website, or a combination thereof.

30. The system of claim 27, wherein the variable inputs comprises flow data for the flow input and efficiency data for the efficiency input, and wherein the one of the variable inputs set to an estimated value comprises the head input set to an estimated head value.

31. The system of claim 30, wherein the variable calculation module to the actual head value based at least in part on a forebay and a tailrace change for the flow data used in solving the linear equation.

32. The system of claim 27, wherein the solution providing module to provide potential profit estimates for a hydroelectric power plant, provide results of a potential turbine comparison, provide a power savings, provide peak shaving data, or a combination thereof.

* * * * *